United States Patent Office 3,170,499
Patented Feb. 23, 1965

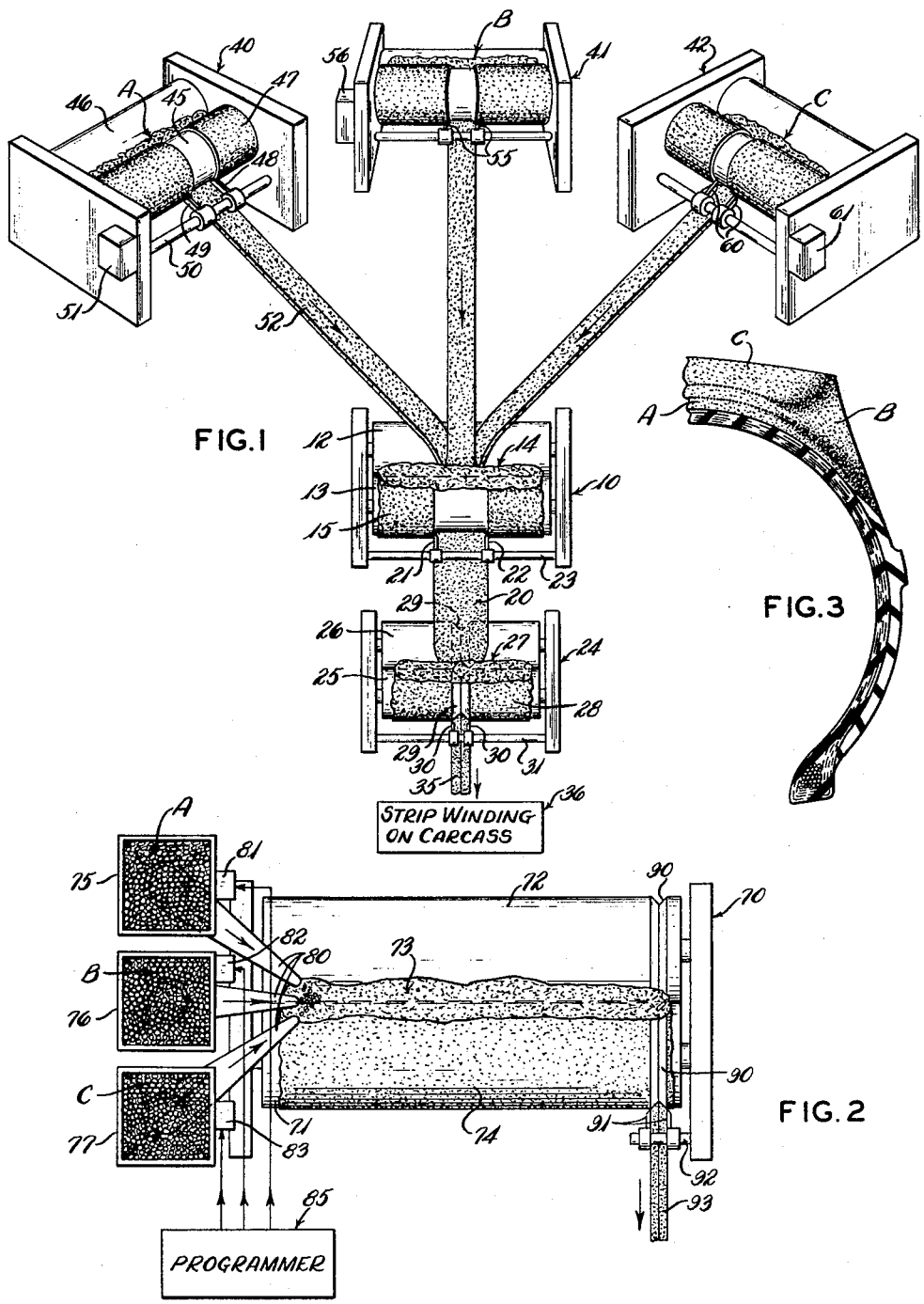

3,170,499
PREPARATION AND APPLICATION OF TIRE MATERIAL, THE TIRE THUS PRODUCED AND THE APPARATUS USED
Herbert H. Deist, Akron, Ohio, assignor to The Firestone Tire & Rubber Company, Akron, Ohio, a corporation of Ohio
Filed Oct. 12, 1962, Ser. No. 230,175
20 Claims. (Cl. 152—330)

This invention relates generally to the art of preparing unvulcanized material incidental to its application to a tire carcass. More particularly the invention is directed to method and apparatus for preparing and applying rubber material to a tire carcass and the improved tire product wherein the rubber material applied to the tire carcass is characterized by being made up of a plurality of different type rubber stocks forming predetermined portions of the tire with a gradual transition from one type rubber stock to another and with each type rubber stock having particular characteristics specifically selected as being best suited for the predetermined portion of the tire which it forms.

The term rubber material is used herein in the generic sense of indicating various rubberlike compositions which may or may not contain material rubber but which are suitable for application to a tire carcass in forming the tire. Also the term tire carcass is contemplated as embracing a cylindrical tire band made up of rubberized fabric plies and beads ready for application of the rubber material thereto as well as tire carcasses to be retreaded.

The techniques employed for many years in new tire building have recognized the advantages and compelling reasons for utilizing different rubber stocks in different portions of a tire. Accordingly, different type rubber stocks combined to give the desired characteristics for the tire in which they are used have been developed. Generally, the rubber stock which isf ormed in the mold into the tread pattern is compounded to provide a relatively stiff, strong material to withstand abrasion. In contrast, the sidewall portions which are generally not exposed to appreciable abrasion may best be made of a rubber stock adapted to withstand the substantial flexure which will be encountered in use of a tire on a vehicle. Additionally, a soft rubber adjacent the fabric plies of the tire carcass provides better adhesion of the rubber to the tire carcass.

In consideration of the above-outlined factors, it has been the practice, particularly in new tire building, to form lengths of unvulcanized rubber material sufficient to encircle the tire carcass and laminate two of such lengths of different type rubber stocks. Under this procedure, the length of one stock will be disposed so that it is finally molded into the tread pattern and the length of the other stock will provide the flexible sidewalls of the tire and, in many cases, a base of soft rubber underlying the length of tread material. This laminating technique has been carried out by various approaches such as separate calendering of the lengths followed by their lamination or by extrusion using tubers whereafter the extruded lengths are laminated. The two-lamination length has become identified in the art as the cap and base, the cap having reference to the rubber which is eventually molded into the tread pattern and the base having reference to the subtread portion which quite frequently forms a base under the cap and also may be of a rubber stock suitable for forming the sidewalls of the tire. As an added advantage in producing the finished tire, a so-called cushion stock of soft rubber may be provided as a layer underlying the base rubber to provide improved adhesion of the rubber material to the outer surface of the rubberized fabric plies on the carcass.

The technique of using only two separate stocks laminated to provide the different type rubber stocks in the manufacture of new tires has been adopted only as a compromise in recognition of the expense and technical problems encountered in attempting to produce a composite length of more than two separate stock laminations. Indeed, there are distinct problems involved in even obtaining two lamination length particularly with respect to achieving effective bonding between the two laminations and also in alleviating the existence of voids or air pockets between the adjoining surfaces of the laminated lengths.

Theoretically, the tire designer in considering the various characteristics of different rubber stocks such as cost, flexibility, abrasion resistance, etc., might prefer to employ a sizable number of different stocks in tire building with each stock being disposed to form a predetermined portion of the tire where its characteristics would most effectively be used. As a practical matter, and particularly with laminated composite lengths as are presently employed, only two or three different type rubber stocks are feasible. The instant invention seeks to remove this limitation on the lamination technique and also minimize the problems heretofore encountered in employing even a two-lamination length.

It is a principal object of the instant invention to provide an improved method and apparatus for preparing rubber material consisting of different type rubber stocks to be applied to a tire carcass wherein a gradual transition from one type rubber stock to another is produced with each type stock disposed to form a predetermined portion of the rubber material on the finished tire to take most effective advantage of the particular characteristics of each rubber stock and meet the service requirements for each portion of the tire.

It is also an object of the instant invention to provide a method and apparatus in accordance with the above object wherein the rubber stocks are each initially prepared by mechanical working on a mill and the changeover from one stock to another is effected by decreasing the rate of supply of one stock and increasing the rate of supply of another stock.

Another object of the instant invention in furtherance of the above first mentioned object is directed to selectively supplying separate rubber stocks to blending mill in pelletized form and effecting changeover from one stock to another by decreasing the pellet supply of one stock and increasing the rate of pellet supply of another stock.

It is also an important object of the instant invention to provide a method and apparatus for application of rubber material to a tire carcass such as to obtain in the built up rubber material, a gradual transition from one type rubber stock to another to promote effective bonding between separate portions of the rubber material on the carcass that are formed from different type rubber stocks.

It is also a principal object of the instant invention to provide an improved vehicle tire construction wherein the body of rubber material which encircles the carcass is made up of separate predetermined portions, each consisting essentially of a different type of rubber stock, each stock having the desired particular characteristics for use in forming one predetermined portion with a gradual transition in the make-up of the rubber material between adjacent different stocks which form adjacent predetermined portions such that effective bonding between these adjacent portions is promoted.

A further object of the instant invention lies in the provision of a method and apparatus for preparing rubber material for application to a tire carcass where different stocks are employed and formed into a continuous strip to be wound on to a tire carcass and thereby build the rubber material portions on the carcass with the strip being formed such that each type rubber stock is properly disposed in the desired predetermined position incidental to winding the strip on to the tire carcass.

An additional object of the invention is to provide in accordance with the above object a continuous strip made up of different type rubber stocks including a length of each type stock with adjacent lengths of different stocks interconnected by a length consisting of a blend of the rubber stocks of these lengths, this strip being adapted to be wound on a tire carcass to build the rubber portions of the tire.

The above and other objects of the instant invention will become more readily apparent by reference to the accompanying drawing in which two preferred embodiments are disclosed by way of example, various modifications and changes of details thereof being contemplated within the scope of the appended claims.

Apparatus for carrying out the method invention and producing the article of the invention is illustrated on the accompanying drawing in which:

FIGURE 1 is a somewhat diagrammatic perspective view of an apparatus assembly suitable for preparing the rubber material for application to a tire carcass in accordance with the invention; and FIGURE 2 is a somewhat diagrammatic plan view of another apparatus assembly for preparing rubber material to be applied to a tire carcass; and FIGURE 3 is a fragmentary sectional view of a tire constructed in accordance with the invention.

It will be appreciated that the components making up the assembly as shown in FIGURE 1 are illustrated only in outline and diagrammatic form. These components may take a variety of standard forms of construction, the details of such construction forming no part of the instant invention.

A blending mill 10 provided with a pair of driven parallel mill rolls 12 and 13 forms one component of the assembly wherein the rubber material that is to be applied to the tire carcass is mechanically worked. The rubber stocks are fed to the mill in the relation described in detail hereinafter whereupon mastication of the material by the action of the driven mill rolls is effected, resulting in the material being worked into a tacky plasticized mass. On FIGURE 1, a mass of rubber material 14 is shown disposed in the bite of the rolls 12 and 13 with a sheet of rubber material 15 formed around roll 13 by the action of the rolls in working the material, such effect being conventional in the operation of a mill.

Upon the rubber material 14 being worked sufficiently such that it has attained the appropriate temperature and consistency in a tacky plasticized form, a strip of material 20 is segregated from the calendered sheet 15. The separation of strip 20 is effected by mill knives 21 and 22 mounted on a shaft 23 supported parallel to the axis of roll 13. The mill knives 21 and 22 slit along the opposite sides of the strip 20 to be removed and the strip is thereupon separated from the sheet 15.

The unvulcanized rubber material strip 20 is shown on FIGURE 1 as being led from the blending mill 10 to a ribbon calender 24. Calender 24 includes a pair of driven calender rolls 25 and 26 and the strip 20 is fed into the bite of the rolls to supply and form a mass of material 27. A calendered sheet of rubber material 28 is formed on roll 25 by the action of rotation of the rolls and the rubber material in mass 27 is further worked to be formable into the shape desired for application to the tire carcass.

The calender rolls 25 and 26 are each provided with a generally V-shaped groove 29, these grooves being aligned so that a generally diamond-shaped opening is provided along the bite of the rolls. A pair of trim knives 30 mounted on a shaft 31 extending parallel to rolls 25 and 26 engage against the surface of roll 25 on opposite sides of the V-shaped groove 29. These knives serve to slit along the opposite sides of the diamond-shaped portion of sheet 28 and thus segregate a strip 35 which provides a ribbon having a diamond-shaped cross section.

The strip 35 as continuously drawn from the ribbon calender 24 is wound onto the exterior surface of a tire carcass to build up rubber material on the carcass to the desired depth across the surface of the carcass. This winding of the strip may be carried out by mounting the tire carcass for rotation while the strip is applied to the carcass as the carcass rotates. This apparatus is designated by the box numeral 36 on the drawing. The strip desirably incorporates the different type rubber stocks and incidental to winding the strip on the carcass these stocks are each deposited at a prescribed predetermined portion on the carcass. The details of application of strip 35 in the form of a diamond-shaped ribbon to the tire carcass is not illustrated on the drawing. Reference may be had to Hanson Patent 2,849,049 for a disclosure of specific techniques which can be employed to wind the ribbon onto the carcass.

A particularly important feature of the instant invention is in the manner in which the rubber material in the form of different rubber stocks is supplied to the blending mill 10 to form the mass 14 from which the calendered strip 20 is withdrawn. In the embodiment illustrated on FIGURE 1, three separate breakdown mills 40, 41 and 42 are shown. The construction of these mills and their operation are essentially identical except for the control in the rate of supply of material from each breakdown mill to the blending mill 10. Accordingly description of the functioning of only one of the breakdown mills will be given.

Referring to breakdown mill 40, it includes a pair of mill rolls 45 and 46 which are driven to masticate a mass A of rubber material. As is conventional in the operation of mills of this type, a sheet of material 47 is thereby produced encircling the mill roll 45. A pair of trim knives 48 and 49 are mounted on a control shaft 50 to be independently movable relative to each other along shaft 50. A control means 51 mounted on the base of the mill 40 and connected through shaft 50 to operate knives 48 and 49 is provided to program the movement of knives 48 and 49 relative to each other. The mill knives 48 and 49 engage the surface of mill roll 45 to slit along the opposite edges of a width of material to be segregated from sheet 47 thereupon permitting a strip 52 of material to be withdrawn from the breakdown mill 40. This strip of material 52 is supplied to the blending mill 10 to form the mass of rubber material 14.

It will be noted that each of the breakdown mills 41 and 42 contain similar components as described above with reference to mill 40. Each of these mills includes a pair of mill knives mounted to be movable relative to each other. This controlled movement of the knives provides for variation of the width of the strip of rubber material segregated and thereafter withdrawn from the particular breakdown mill. Each strip when withdrawn is thereupon supplied to blending mill 10. In breakdown mill 41, the knives are indicated at 55 with the control for programming their movement being shown at 56. On mill 42, the knives are shown at 60 with the control for programming their movement being shown at 61.

Each of the mills 40, 41 and 42 is supplied with a particular type rubber stock; the rubber stock on mill 40 being in the form of a mass A, the rubber stock on mill 41 is identified at B and on breakdown mill 42 at C. In an actual installation, the mass A may consist of a cushion rubber stock, the mass B may be base rubber stock and the mass C, cap rubber stock. Although three breakdown mills are illustrated, it will be appreciated that only two type rubber stocks may be required whereupon only two breakdown mills will be needed. Further, two breakdown mills can be utilized to produce three different stocks: a first stock, a second stock, and a third stock comprising a blend of the other two stocks. Similarly, where use of more than three rubber stocks is desired, a greater number of breakdown mills appropriate to the number of stocks to be employed will be provided.

The control of the rate of supply of rubber material from the respective breakdown mills 40, 41 and 42 is effected by controlling the spacing between the pairs of mill knives on the respective breakdown mills assuming a constant drive speed for the mills. This control action and the manner that the control is programmed is important in achieving a rubber material strip prepared in a manner for application to the tire carcass to provide the results desired for the instant invention. No specific structural form of control for the mill knives has been illustrated, it being recognized that a variety of suitable constructions for control of movement of the knives in accordance with desired programming for supply of the material may be employed.

In operation of the controls 51, 56 and 61 for the respective breakdown mills, a strip 52 from the mass A is initially fed from breakdown mill 40 to blending mill 10, this strip being sufficient so that strip 20 and, in turn, strip 35 in the form of a diamond-shaped ribbon can be completely formed from the rubber stock making up mass A on mill 40. The ribbon 52 of appropriate width in relation to the speed of its production is fed to blending mill 10 until an adequate length of strip 35 to build up the desired predetermined portion on the carcass for which rubber stock A is to be used has been produced. This layer may be denoted as the cushion layer where stock A is a cushion rubber stock.

At this point or as the quantity of the production of strip 35 approaches completing the quantity requirements for this particular type stock, the control 51 will cause movement of knives 48 and 49 toward each other thereby diminishing the width of strip 52 and consequently reducing the quantity of material being delivered from mill 40 to mill 10. At the same time the control 56 will commence movement of mill knives 55 apart and a strip will be supplied from mass B on breakdown mill 41 to mill 10. By the time the width of the strip supplied from mass B and its rate of delivery is sufficient to supply the requirements for production of strip 35, the mill knives 48 and 49 on breakdown mill 40 will be operated to terminate supply of a strip 52 from mass A and thereafter the strip 35 will be produced solely from the material B on breakdown mill 41. In a three-stock installation the material making up the mass B may be base rubber stock. See FIGURE 3.

When a sufficient quantity of rubber material of stock B has been delivered in the form of strip 35 to produce the desired portion on the tire carcass which is to be constructed from type stock B the control 56 commences movement of mill knives 55 together reducing the width of strip formed from stock B. The control 61 on mill 42 thereupon initiates segregation of a strip of material from mass C which is of the third type stock. In turn, the supply of rubber from mass B is terminated by knives 55 moving together under regulation of control 56. The rubber material to form strip 35 thereafter is supplied from the mass C on breakdown mill 42 until such time as the desired quantity of the stock which makes up the mass C has been supplied to the tire carcass to form the predetermined portion for which this stock is intended to be used.

In describing an operation method for the embodiment of FIGURE 1 it has been mentioned that each stock is terminated when a different stock is to take over to supply the make up for the ribbon. However, it might be desirable to maintain continuity of the three strips supplied from the breakdown mills to the blending mills so, for example, the programming control of the mill knives can repeat the cycle for successive tires. In such event, the programming controls for the mill knives on the three breakdown mills may only diminish the strip width to a minimum width which will only be adequate to continue the strip intact but not seriously contribute to the make up of the strips to be wound on tire carcass at a time when this latter strip is to be constituted of only one specific rubber stock. Reducing the strips to minimum width during times that the stock of such strip is not called for will maintain continuity of all strip supplies and avoid having to start a strip from the mill roll as would be necessary where the strip is terminated when its stock is not called for.

Referring to the embodiment shown on FIGURE 2, there is illustrated an alternative approach to supplying different type rubber stocks to a blending mill for forming a continuous rubber material strip to be applied to a tire carcass so that the appropriate type rubber stock will be disposed at each predetermined portion on the carcass. The structure involves a blending mill 70 which includes two driven mill rolls 71 and 72. A mass of material 73 is built up in the bite of rolls 71 and 72 from a supply of pelletized rubber material contained in separate pellet hoppers 75, 76 and 77. These hoppers contain a supply of rubber stocks A, B and C, respectively, comparable to the stocks forming masses A, B and C in the FIGURE 1 embodiment described above but in pelletized form.

Each of the hoppers 75, 76 and 77 has a chute 80 for directing the pelletized material from the hopper to one end of the bite between rolls 71 and 72. The flow of pellets from hopper 75 to its chute 80 is controlled by a valve 81. The control of dispensing pelletized material B from hopper 76 to its chute 80 is controlled by valve 82 and a valve 83 controls the flow of pellet material C from hopper 77. The regulation of the valves 81, 82 and 83 to obtain the desired supply of pelletized rubber material to make up mass 73 on the blending mill 70 is obtained by a suitable programmer 85. Again, two hoppers containing pellets of different material can produce three different stocks: a first, a second, and a third stock comprising a blend of the first two.

The mill rolls 71 and 72 each have a V-shaped groove 90 formed at one end thereof with the grooves in the adjacent rolls being aligned to provide a generally diamond-shaped opening between the bite of the rolls. Thus by driving the rolls, the calendered sheet 74 formed on the roll 71 is provided with a diamond-shaped enlargement. A pair of trim knives 91 are mounted on a shaft 92 and press against the surface of mill roll 71 on opposite sides of groove 90 to segregate strip 93 which is removed from the surface of roll 71 in the form of a diamond-shaped ribbon.

In the operation of the embodiment of FIGURE 2, a quantity of pelletized rubber material A is supplied from hopper 75 by appropriate opening of valve 81 under control of programmer 85. The pellets feed onto one end between the bite of rolls 71 and 72 and are masticated by the driving action of the rolls which also cause the material to work along the bite of the rolls to a point where it reaches and builds up on the right end of the rolls as shown in FIGURE 2. The strip 93 which will at this point be made up of stock A is thereupon withdrawn from the blending mill and can be applied to the tire carcass to form the portion thereof to be made up of stock A.

When this portion has been built on the carcass, the supply of pellets from hopper 75 will have been terminated and the supply of stock B from hopper 76 commenced. With this changeover, the rubber mass 73 will be made up of stock B and in turn an appropriate quantity will be supplied to make up a sufficient length of strip to build the portion of the tire carcass which is to be made up of type stock B. Thereafter, a changeover to supply stock C from hopper 77 will be effected and valve 82 closed to terminate the supply of pellets from hopper 76. The appropriate timing in opening and closing of the valves 81, 82 and 83 will be effected by the operation of programmer 85 which may take any of a number of suitable forms, taking into consideration the rate of production of the strip 93 consisting of proportions of the different type stocks A, B and C needed to form the predetermined portions on the tire carcass for which each stock is to be employed.

It will be recognized that as in the first described embodiment more or less than three different stocks may be supplied in forming the desired strip to be wound onto the tire carcass. In both cases the resulting strip will be of a continuous length made up of separate lengths, each of a particular type rubber stock with adjacent ones of these lengths being connected by a blended section of strip wherein the rubber material is going through a transition from one type stock to another. The length of each section of the strip making up the quantity of one stock will, of course, be determined by the quantity of that particular stock necessary to produce the predetermined portion on the tire carcass taking into consideration the cross-sectional area of the strip.

Although reference has been made hereinabove to the production of a strip in the form of a generally diamond-shaped cross-section ribbon and to winding this strip on a tire carcass employing techniques as disclosed in Hanson Patent 2,849,049, it is to be understood that the strip made up in accordance with the instant invention and as wound on to the carcass may take the form of a wide strip and possibly a strip of varying width to build the desired tire rubber cross-section. This latter approach and more specific details of the manner in which it may be employed are disclosed in copending Deist application Serial No. 224,459, filed September 18, 1962.

It is to be understood that the forms of the invention herein shown and described are to be taken only as preferred examples of the same and that various changes in size, shape, arrangement of parts, method steps, etc. may be resorted to without departing from the invention or scope of the appended claims. One obvious variation which might be mentioned would be the utilization of extruder means in place of one or more of the mills and calender as referred to in the embodiments described wherein feed to the extruder means would be controlled as described with reference to feeding the mills and calender.

What is claimed is:

1. The method of preparing rubber material for application to a tire carcass to obtain a gradual transition from one type rubber stock to another in building up the rubber material on the carcass comprising the steps of mechanically working a quantity of a first type rubber stock having particular characteristics desired for use in forming a first predetermined portion on the tire carcass, forming a part of said quantity into a strip for application to the tire carcass as said first predetermined portion on the tire carcass, mechanically blending part of a quantity of a second type rubber stock with the remaining part of said first stock, said second stock having particular characteristics desired for use in forming a second predetermined portion on the tire carcass, forming the blended stocks into a continuation of the strip of first type stock for application to the tire carcass as a portion intermediate said first and second predetermined portions on the tire carcass, mechanically working the remainder of said quantity of the second type stock, and forming said remainder into a strip as a continuation of the strip of blended stocks for application to the tire carcass as said second predetermined portion on the tire carcass.

2. The method as recited in claim 1 wherein said second type rubber stock is a cap rubber stock to form the tread pattern in the finished molded tire.

3. The method as recited in claim 1 wherein said first and second type rubber stocks are base rubber stock and cap rubber stock respectively.

4. The method as recited in claim 1 wherein a part of a quantity of a third type rubber stock is mechanically blended with the latter part of the second type stock and a continuation of the strip of second type stock is formed consisting of a blend of the second and third stocks followed by a strip made up of third type stock for application to the tire carcass as a third predetermined portion of the tire carcass, said third type rubber stock being selected as having particular characteristics desired for use in forming said third predetermined portion on the tire carcass.

5. The method as recited in claim 4 wherein said first, second and third type rubber stocks are respectively cushion rubber stocks, base rubber stock and cap rubber stock.

6. The method as recited in claim 1 wherein said rubber stocks are each initially prepared by mechanical working on a mill and the changeover from one stock to another in forming the strip is effected by decreasing the rate of supply of one stock from its mill and increasing the rate of supply of another stock from its mill as such stocks are supplied to a blending mill prior to forming the strip for application to the tire carcass.

7. The method as recited in claim 1 wherein said rubber stocks are supplied to a blending mill in pelletized form for mechanical working therein and the changeover from one stock to another in forming the strip is effected by decreasing the rate of pellet supply of one stock and increasing the rate of pellet supply of another stock as such stocks are supplied to the blending mill prior to forming the strip for application to the tire carcass.

8. The method of application of rubber material to a tire carcass to obtain a gradual transition from one type rubber stock to another in building up the rubber material on the carcass comprising the steps of mechanically working a quantity of a first type rubber stock having particular characteristics desired for use in forming a first predetermined portion on the tire carcass, forming a substantial part of said quantity into a strip, winding said strip onto a tire carcass to define the first predetermined portion on the tire carcass, mechanically blending part of a quantity of a second type rubber stock with the remaining part of said first stock, said second stock having particular characteristics desired for use in forming a second predetermined portion on the tire carcass, forming the blended stocks into a continuation of the strip of first type stock, mechanically working the remainder of said quantity of the second type stock, forming said remainder into a strip as a continuation of the strip of blended stocks, and continuing winding the strip onto the tire carcass to define the second predetermined portion on the tire carcass with the strip of said second type stock.

9. The method as recited in claim 8 wherein said second type rubber stock is cap rubber stock and said strip is in the form of a ribbon which in being wound on the tire carcass is distributed on the surface of the carcass to build up the desired final contour for the tread shoulders and tread intermediate the tread shoulders on the carcass preparatory to molding the tire tread thereon.

10. The method as recited in claim 8 wherein said rubber stocks are each initially prepared by mechanical working on a mill and the changeover from one stock to another in forming the strip is effected by decreasing the rate of supply to one stock from its mill and increasing the rate of supply of another stock from its mill as such stocks are supplied to a blending mill prior to forming the strip that is wound onto the tire carcass.

11. The method as recited in claim 8 wherein said rubber stocks are supplied to a blending mill in pelletized form for mechanical working therein and the changeover from one stock to another in forming the strip is effected by decreasing the rate of pellet supply of one stock and increasing the rate of pellet supply of another stock as such stocks are supplied to the blending mill prior to forming the strip that is wound onto the tire carcass.

12. A vehicle tire comprising
   a tire carcass,
   a body of rubber material encircling said carcass,
   said body being made up of separate predetermined portions with each portion consisting essentially of a selected type of rubber stock and the rubber stock of which each portion consists having particular characteristics desired for use in forming such portion,
   said portions being disposed in a predetermined relation to each other and to the body,
   and said body having a gradual transition therewithin between adjacent different type rubber stocks which form adjacent predetermined portions of said body to promote effective bonding between said adjacent portions of the body.

13. A vehicle tire comprising
   a tire carcass,
   a body of rubber material encircling said body and forming the tread on said carcass,
   said body being made up of a cushion portion, a base portion and a cap portion,
   each of said portions being formed essentially from a rubber stock having particular characteristics desired for use in forming the portion,
   and said body having a gradual transition between the rubber stocks of said cushion portion and said base portion and between said base portion and said cap portion to promote effective bonding between the separate portions of the body that are formed from different type rubber stocks.

14. Apparatus for preparing rubber material to produce a gradual transition from one type rubber stock to another upon application of the rubber material to the carcass comprising
   a blending mill having driven rolls operable to mechanically work rubber material therebetween to form it into a tacky plasticized mass,
   means for separately supplying different type rubber stocks to said blending mill,
   control means coupled to control the rate of supply of each of said different type rubber stocks to said blending mill to effect initial supply of a first type rubber stock to said mill and gradually thereafter to change over to supply of a second type rubber stock,
   and means associated with said blending mill for forming a continuous strip of rubber material from the tacky plasticized mass on said blending mill as the rubber stocks are supplied thereto.

15. Apparatus for preparing rubber material to produce a gradual transition from one type rubber stock to another upon application of the rubber material to the carcass comprising
   a blending mill having driven rolls operable to mechanically work rubber material therebetween to form it into a tacky plasticized mass,
   a separate brakdown mill for each of a plurality of different type rubber stocks,
   means for supplying a variable quantity of the rubber stock worked on each breakdown mill to said blending mill,
   control means for each breakdown mill to control the rate of supply of each of said stocks to said blending mill to effect initial supply of stock from one breakdown mill and gradually thereafter change over to supply of stock from another breakdown mill,
   and means associated with said blending mill for forming a continuous strip of rubber material from the tacky plasticized mass on said blending mill as the rubber stocks are supplied thereto.

16. Apparatus for preparing rubber material to produce a gradual transition from one type rubber stock to another upon application of the rubber material to the carcass comprising
   a blending mill having driven rolls operable to mechanically work rubber material therebetween to form it into a tacky plasticized mass,
   a supply means for each of a plurality of pelletized different type rubber stocks connected to feed the stocks to said blending mill,
   control means for each supply means to control the rate of supply of each of said pelletized stocks to said blending mill to effect intial supply of stock from one supply means and gradually thereafter change over to supply of stock from another supply means,
   and means associated with said blending mill for forming a continuous strip of rubber material from the tacky plasticized mass on said blending mill as the rubber stocks are supplied thereto.

17. Apparatus for applying rubber material to a tire carcass to obtain a gradual transition from one type rubber stock to another in building up the rubber material on the carcass comprising
   a blending mill having driven rolls operable to mechanically work rubber material therebetween to form it into a tacky plasticized mass suitable for application to a tire carcass,
   means for separately supplying different type rubber stocks to said blending mill,
   control means coupled to control the rate of supply of each of said different type rubber stocks to said blending mill to effect initial supply of a first type rubber stock to said mill and gradually thereafter change over to a second type rubber stock,
   means associated with said blending mill for forming a continuous strip of rubber material from the tacky plasticized mass on said blending mill as the rubber stocks are supplied thereto,
   and means for winding said continuous strip onto a tire carcass to dispose each rubber stock as a predetermined portion on the carcass.

18. Apparatus for applying rubber material to a tire carcass to obtain a gradual transition from one type rubber stock to another in building up the rubber material on the carcass comprising
   a blending mill having driven rolls operable to mechanically work rubber material therebetween to form it into a tacky plasticized mass suitable for application to a tire carcass,
   a separate breakdown mill for each of a plurality of different type rubber stocks,
   means for supplying a variable quantity of rubber stock worked on each breakdown mill to said blending mill,
   control means for each breakdown mill to control the rate of supply of each of said stocks to said blending mill to effect initial supply of stock from one breakdown mill and gradually therafter change over to supply of stock from another breakdown mill,
   means associated with said blending mill for forming a continuous strip of rubber material from the tacky plasticized mass on said blending mill as the rubber stocks are supplied thereto,
   and means for winding said continuous strip onto a tire carcass to dispose each rubber stock as a predetermined portion on the carcass.

19. Apparatus for applying rubber material to a tire carcass to obtain a gradual transition from one type rubber stock to another in building up the rubber material on the carcass comprising
   a blending mill having driven rolls operable to mechanically work rubber material therebetween to form it into a tacky plasticized mass suitable for application to a tire carcass, a supply means for each of a plurality of pelletized different type rubber stocks connected to feed the stock to said blending mill, control means for each supply means to control the rate of supply of each of said pelletized stocks to said blending mill to effect initial supply of stock from one supply means and gradually thereafter change over to supply of stock from another supply means, means associated with said blending mill for forming a continuous strip of rubber material from the tacky plasticized mass on said blending mill as the rubber stocks are supplied thereto, and means for winding said continuous strip onto a tire carcass to dispose each rubber stock as a predetermined portion on the carcass.

20. The method of preparing rubber material for application to a tire carcass to obtain a gradual transition from one type of rubber stock to another in building up the rubber material on the carcass comprising the steps of mechanically working a quantity of a first type rubber stock for use in forming a first predetermined portion on the tire carcass, forming a part of said quantity into a first strip for application to the tire carcass as said first predetermined portion on the tire carcass, mechanically working a quantity of a second type rubber stock for use in forming a second predetermined portion on the tire carcass, forming a part of said quantity of second type rubber into a second strip for application to the tire carcass as said second predetermined portion on the tire carcass, in continuation of said first strip, mechanically blending the remaining part of a said second stock with the remaining part of said first stock, forming the blended stocks into a continuation of said second strip for application to the tire carcass as a third predetermined portion on the tire carcass.

References Cited by the Examiner
UNITED STATES PATENTS

| | | | |
|---|---|---|---|
| Re. 25,349 | 3/63 | Hanson | 156—130 |
| 1,220,178 | 3/17 | Brucker | 156—128 |
| 1,356,891 | 10/20 | Steinle | 18—13 |
| 1,975,883 | 10/34 | Veit | 156—244 X |
| 2,437,873 | 3/48 | Beward | 156—244 X |
| 2,632,204 | 3/53 | Murray | 18—13 |
| 2,663,901 | 12/53 | Hale et al. | 18—2 |
| 2,769,201 | 11/56 | Lorenian | 18—13 |
| 2,840,137 | 6/58 | Wortz | 156—244 X |
| 2,994,913 | 8/61 | Holman | 18—2 |

EARL M. BERGERT, *Primary Examiner.*